(12) United States Patent
Mannhardt

(10) Patent No.: US 10,962,486 B2
(45) Date of Patent: Mar. 30, 2021

(54) SYSTEM FOR THE PROCESS-INTEGRATED OPTICAL ANALYSIS OF FLOWABLE MEDIA

(71) Applicant: Blue Ocean Nova AG, Eschach (DE)

(72) Inventor: Joachim Mannhardt, Eschach (DE)

(73) Assignee: Blue Ocean Nova AG, Eschach (DE)

( * ) Notice: Subject to any disclaimer, the term of this patent is extended or adjusted under 35 U.S.C. 154(b) by 20 days.

(21) Appl. No.: 16/462,627

(22) PCT Filed: Oct. 5, 2017

(86) PCT No.: PCT/EP2017/075290
§ 371 (c)(1),
(2) Date: May 21, 2019

(87) PCT Pub. No.: WO2018/091197
PCT Pub. Date: May 24, 2018

(65) Prior Publication Data
US 2020/0064272 A1   Feb. 27, 2020

(30) Foreign Application Priority Data

Nov. 21, 2016   (DE) .................... 10 2016 122 386.7

(51) Int. Cl.
*G01N 21/85*   (2006.01)
*G01B 21/04*   (2006.01)
*G01N 21/59*   (2006.01)

(52) U.S. Cl.
CPC ........... *G01N 21/85* (2013.01); *G01B 21/047* (2013.01); *G01N 21/59* (2013.01); *G01N 2201/0224* (2013.01)

(58) Field of Classification Search
CPC .... G01N 21/85; G01N 21/05; G01N 21/0303; G01N 21/8507; G01B 21/047
See application file for complete search history.

(56) References Cited

U.S. PATENT DOCUMENTS 4,887,016 A * 12/1989 Malick .................. B25J 9/1692
                                                              700/254
6,290,912 B1   9/2001 Doms
(Continued)

FOREIGN PATENT DOCUMENTS

DE   102004045816 A1   6/2005
DE   102009028254 A1   10/2010
(Continued)

*Primary Examiner* — Maurice C Smith
(74) *Attorney, Agent, or Firm* — Christopher R. Powers; Endress+Hauser (USA) Holding Inc.

(57) ABSTRACT

The present disclosure relates to a system for process-integrated optical analysis of flowable media, comprising a processing system for processing a flowable medium and an analytical system for analysis of the flowable medium, wherein the analytical system includes an optical measuring head, for irradiation of the medium and for receiving measuring radiation, and a reference unit. The processing system includes a measuring region, into which the medium can be introduced during the processing and which is accessible for measurement by means of the measuring head. According to the invention, a mechanism for achieving defined positions of the measuring head relative to the measuring region and/or relative to a reference unit is included, which selectively enables a measurement of the medium located in the measuring region or of the reference unit.

11 Claims, 5 Drawing Sheets

(56) References Cited

U.S. PATENT DOCUMENTS

| | | | | |
|---|---|---|---|---|
| 2011/0042582 A1* | 2/2011 | Ingber | ............... | G01N 21/6486 |
| | | | | 250/458.1 |
| 2014/0326048 A1* | 11/2014 | Jaffe | ..................... | A61B 5/083 |
| | | | | 73/31.05 |
| 2014/0346364 A1* | 11/2014 | Lawal | ............... | G01N 21/8507 |
| | | | | 250/373 |
| 2014/0362381 A1* | 12/2014 | Lindmuller | ......... | G01N 21/278 |
| | | | | 356/408 |
| 2016/0059419 A1* | 3/2016 | Suzuki | .................. | B25J 9/1697 |
| | | | | 700/114 |

FOREIGN PATENT DOCUMENTS

| | | | |
|---|---|---|---|
| EP | 2927668 | A1 | 10/2015 |
| WO | 2010053486 | A1 | 5/2010 |
| WO | 2015011782 | A1 | 1/2015 |

\* cited by examiner

SYSTEM FOR THE PROCESS-INTEGRATED OPTICAL ANALYSIS OF FLOWABLE MEDIA

CROSS-REFERENCE TO RELATED APPLICATIONS

The present application is related to and claims the priority benefit of German Patent Application No. 10 2016 122 386.7, filed on Nov. 21, 2016 and International Patent Application No. PCT/EP2017/075290 filed on Oct. 5, 2017, the entire contents of which are incorporated herein by reference.

TECHNICAL FIELD

The invention relates to a system for process-integrated optical analysis of flowable media.

BACKGROUND

The optical analysis of gaseous, liquid or pasty media in processes, especially in industrial manufacturing or processing processes, is possible with immersion probes, flow-through cells and other measuring cells. In such case, the material of the utilized components must be chemically suitable for the media to be analyzed, in order to assure a high inertness, thus, to prevent that utilized components are attacked by the medium to be analyzed.

Each optical system must, however, be periodically calibrated and also, for example, readjusted as regards a zero setting, or a zero-point alignment performed. In a process-integrated system, such is only possible by replacing the process medium with a "reference medium". This procedure is very complex and time consuming, because cleaning steps are needed and the reference section must be sealed (e.g., bypassed) from the process flow.

In laboratory systems, the direct contact of observation windows is not possible, because the medium is placed in a cuvette or flow-through cuvette.

SUMMARY

An object of the present invention, therefore, is to provide an inert, closed system in which the reference measurement and the zero-point alignment are performable.

This object is achieved by an apparatus with the features set-forth in the independent claim; the dependent claims concern advantageous forms of embodiments and further developments of the invention.

The system of the invention for process-integrated optical analysis of flowable media includes a processing system for processing a flowable medium, for example, a mixing or filling plant, e.g. a bottling plant. In addition, the system includes an analytical system for analysis of the flowable medium, wherein the analytical system has an optical measuring head for irradiation of the medium and for receiving measuring radiation, as well as a reference unit.

The processing system includes a measuring region into which the medium can be introduced during the processing and which is accessible for measurement by means of the measuring head. The measuring region can be, for example, an interior of a flow-through cell.

According to the invention, a mechanism for achieving defined positions of the measuring head relative to the measuring region and/or relative to a reference unit is present, which selectively enables a measurement of the medium located in the measuring region or of the reference unit.

The flow-through cell, i.e., measuring region, can, in such case, be implemented largely independently of the analytical system and can be chemically inert as regards the medium to be analyzed. In fact, the measuring region, e.g., the flow-through cell, is implemented as part of the plant. In such case, the flow-through cell can be provided with optical windows or manufactured of appropriately optically transmissive material for the intended spectral range. The intended spectral range can especially extend from the UV region to the mid-infrared region.

An advantage of the system of the invention resides in the separation of the measuring region, thus, for example, the interior of a flow-through cell with observation window, and the optical analytical system. This separation permits then a mechanical movement, which enables positioning analytical system and measuring region selectively relative to one another, especially to remove the measuring head from the flow-through cell and to move it to a reference region.

The solution of the invention enables conducting a reference measurement or a zero-point alignment, without having to change the medium present in the measuring region of the plant. The reference measurement as well as the zero-point alignment are with this arrangement also timewise completely decoupled from the production or process flow such that the need for an interruption of the production process for a reference measurement or a zero-point alignment is eliminated.

Moreover, the proposed system enables an easier cleaning compared to the state of the art; furthermore, the flow-through cell can be integrated by use of conventional flanges into the flow of media in the plant in simple manner.

Which of the involved components is moved for creating the particularly desired relative position can be selected in accordance with the particular measuring situation. Thus, it is, for example, an option to arrange the measuring region in a section of a flexible line of the plant, which can be positioned reproducibly relative to the, in this case, especially fixed measuring head for a measurement procedure. Likewise, for a reference measurement or calibration, the, in this case, likewise movable reference unit could be positioned opposite the measuring head.

It is, additionally, also an option to embody the measuring head movably. Thus, the measuring head can, for example, be embodied rotatably or pivotably or provided with a linear movement.

For defined positioning of the measuring head relative to the measuring region and/or relative to the reference unit, at least one mechanical stop can be advantageously provided.

Furthermore, for additional improvement of the reliability and reproducibility of the measurements, at least one sensor can be included for determining the position of the measuring head relative to the measuring region and/or relative to the reference unit.

The measuring head can especially have a measurement zone, which for measurement can be made to register at least partially with the measuring region and which is passed through during measurement at least partially by measuring radiation; in such case, the measuring zone can be arranged at least partially in a recess, especially between the legs of a U-shaped region, of the measuring head.

The measuring head can especially be adapted to conduct a transmission measurement.

The length of measurement path can be less than 100 mm, especially less than 10 mm.

A length of measurement path of about 100 mm especially increases the sensitivity of the analytical system in the case of low concentrations. Advantageously used in this case is a flow-through cell with the above-mentioned length and lateral connection nozzles. This arrangement enables then the placing of the flow-through cell and reference unit such that by linear or rotational movement the measurement positions and the reference position can be brought about.

For gas analysis, also so-called multipath cells, so-called White cells with multiple reflection of the light beam for lengthening the layer length, or measurement path, provide an option. In such case, likewise the above-described arrangement can be selected. Moreover, this arrangement enables also so-called multiplexing of a number of flow-through cells. In this way, it is possible to implement different layer thicknesses with a plurality of flow-through cells, whereby the dynamic range is enlarged or even different media can flow through different flow-through cells.

In an advantageous variant of the invention, the reference unit can be embodied movably relative to the processing system; especially the reference unit can be embodied to be guided in its movement.

The reference unit can, for example, be embodied rotatably or pivotably or provided with a linear movement.

In an additional form of embodiment of the invention, the measuring head can be connected with a sensor unit, which is movably guided together with the measuring head.

The invention is suited especially, however, not exclusively, for use in the chemicals, petrochemicals, galvanic, electronic, foods, drinks and pharmaceuticals industries.

BRIEF DESCRIPTION OF THE DRAWING

Examples of embodiments and variants of the invention will now be explained in greater detail based on the appended drawings, the figures of which show as follows.

DETAILED DESCRIPTION

Figure 1:
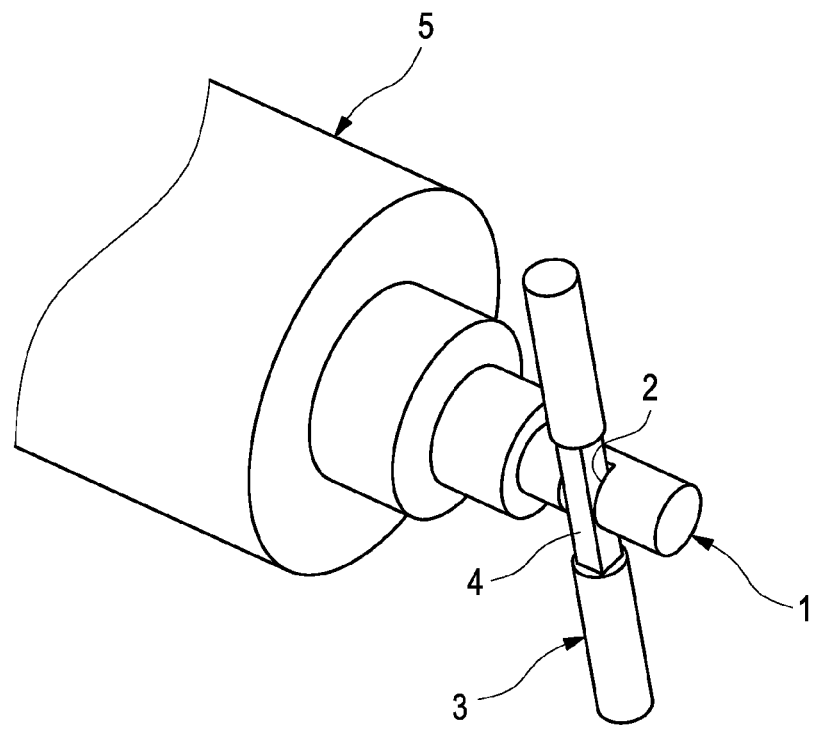
FIG. 1 shows a first form of embodiment of the system of the invention.

FIG. 1 shows in a perspective view a first form of embodiment of the system of the invention. In the shown example, the optical measuring head 1 is embodied in the form of a bracket, such that the measuring head 1 includes a U-shaped recess 2. In such case, the optical measuring head 1 surrounds on three sides a flow-through cell 3 arranged in the U-shaped recess 2. Especially, these three sides are therewith available for measurements, which means that from the directions of such three sides measuring radiation can be in-coupled into the interior of the flow-through cell 3 and therewith into a measuring region 4, and radiation from the interior of the flow-through cell 3 can be received. In the interior (not shown) of the optical measuring head 1, components for beam guidance and beam forming are arranged, for example, mirrors and/or optical waveguides. The flow-through cell 3 has in the region located in the U-shaped recess 2 of the measuring head 1 in the illustrated example an essentially square cross section, so that in the interior of the flow-through cell 3 a layer thickness for measurement results, which corresponds to the edge length of the square-shaped, free cross-section of the flow-through cell 3. The flow-through cell 3 can, in such case, be connected by connection flanges (not shown) with one or more lines of a plant (for example, a bottling plant (not shown)), in order to receive the medium to be examined, for example, a fruit juice, an alcoholic drink or even a powder. In the shown example, the flow-through cell 3 can be manufactured especially of quartz glass or some other suitable material. Likewise shown in FIG. 1 is the sensor unit 5, which is directly connected with the measuring head 1, especially in the illustrated example directly flanged to the measuring head 1. Suitable sensor units are sold by Blue Ocean Nova AG, Eschach, Germany. These sensor units have a compact form for industrial applications and contain especially usually one or more light sources as well as corresponding detectors, as well as also operating electronics required for measuring, including evaluating electronics, in order especially to enable a simple process-integrated optical analysis of the materials to be examined.

Shown in FIG. 2, again schematically, is the light path through sensor unit 5, measuring head 1 and flow-through cell 3. First, a light beam emerges from a source 6 arranged in the sensor unit 5, passes through the inner wall of the U-shaped recess through a suitable optical window (not separately shown) thereof and then enters into a quartz rod 7 mounted on the outer wall of the flow-through cell 3. After leaving the quartz rod 7, the light path extends further to a second quartz rod 8 arranged on the opposite side of the flow-through cell 3 and from there via a likewise not separately illustrated coupling window back into the measuring head 1, where a reversal of the light beam is performed via a reversing prism 9 and the light transmitted through the flow-through cell is fed to a detector 10 arranged in the sensor unit 5. The flow-through cell 3 can have different geometric forms, especially prismatic such as shown, however, also cylindrical or be embodied with an alternative geometry.

Figure 2:
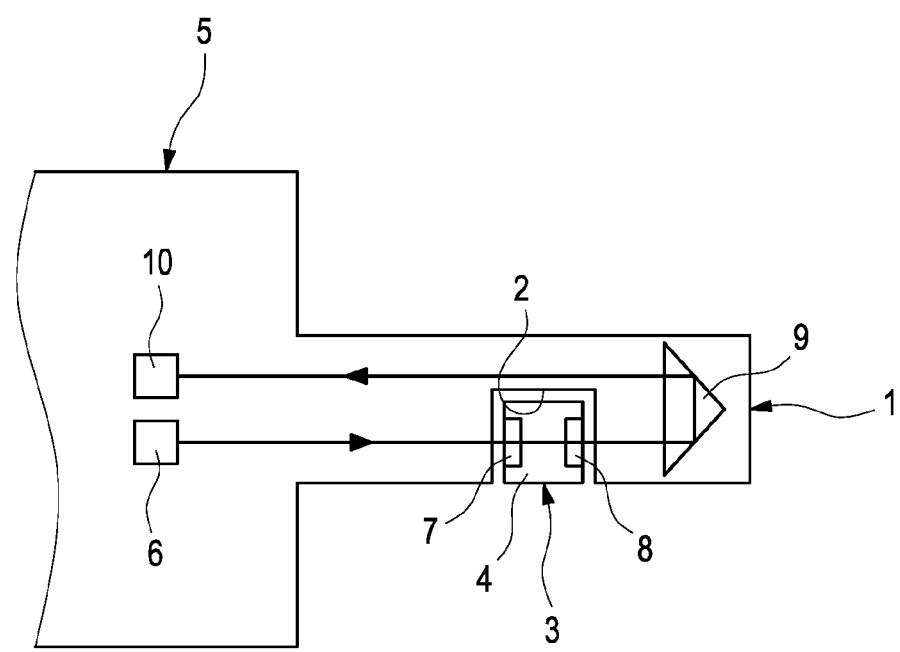
FIG. 2 schematically shows the light path through sensor unit, measuring head and flow-through cell.

Well recognizable in FIG. 2 is the precise selectability of the desired layer thicknesses by a suitable dimensioning of the quartz rods 7, 8. Of course, depending on the electromagnetic radiation used for optical measuring, it is not absolutely necessary that they be quartz rods; also other suitable materials are possible. Moreover, it is also not required in all cases that a transmission measurement be performed; it is also certainly possible to use the shown arrangement as a reflection measuring arrangement or even to conduct a fluorescence measurement at an angle of about 90 degree from the original light propagation direction.

Figure 3:
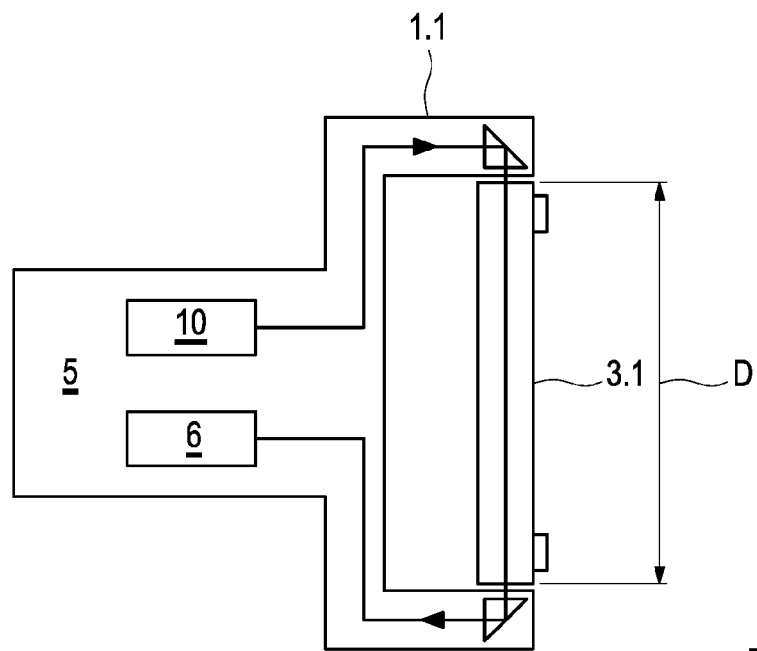
FIG. 3 shows a form of embodiment with an increased layer thickness.

FIG. 3 shows a form of embodiment of the invention with an increased layer thickness compared with variants shown in the preceding forms of embodiment. Well recognizable besides the schematically illustrated measuring head 1.1 and the sensor unit 5 with light source 6 and detector 10 is the longitudinally irradiated flow-through cell 3.1 with lateral connections for the introduction and removal of the flowable medium to be examined. Likewise indicated in the figure is the layer thickness D. The shown variant enables in a form of embodiment (not shown) known as a "White cell" especially also the implementing of multiple reflections and therewith an additional increasing of the effective layer thickness.

Figure 4:
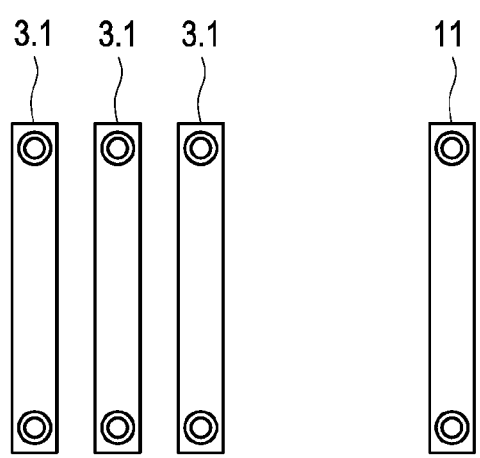
FIG. 4 shows a variant embodiment for multiplexing.

The shown arrangement can be used in advantageous manner to implement a multiplex measurement as shown in FIG. 4. FIG. 4 shows a linear arrangement of a plurality of longitudinally irradiateable flow-through cells known from FIG. 3 as well as a reference unit embodied as reference cell 11. If one now provides the optical measuring head and the associated sensor unit, for example, with a suitable linear movement, then a multiplex measurement can be conducted, i.e., a measurement of varied media present in the longitudinally flowed through, flow-through cells 3.1, by a movement of the measuring head 1.1 past the flow-through cells 3.1.

Figure 5:
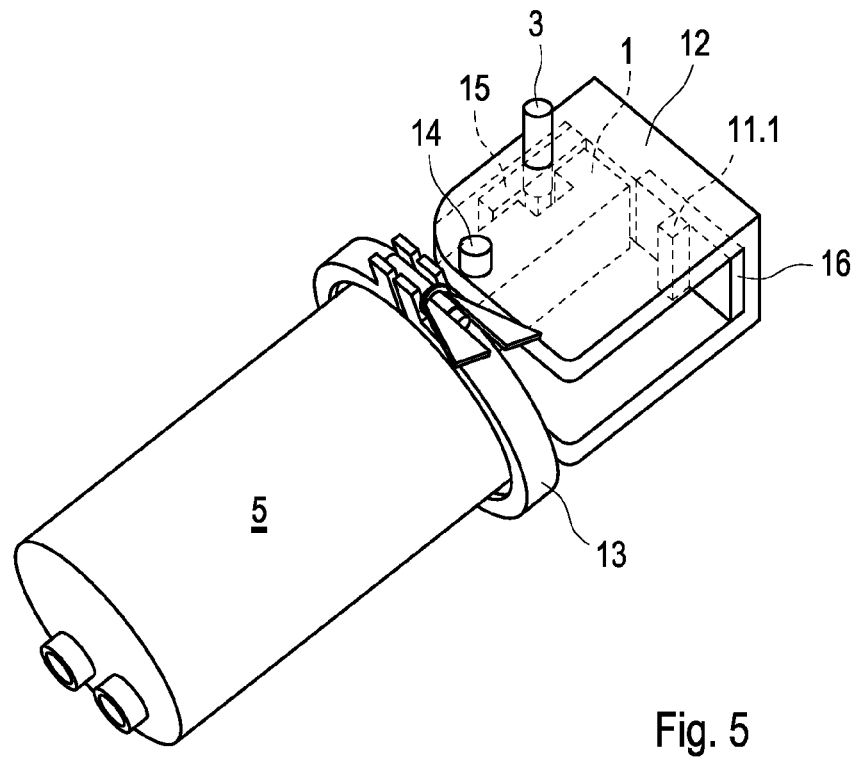
FIG. 5 shows a system of the invention in a measuring position.

FIG. 5 shows in a perspective view, pivotally mounted on a support body 12, an arrangement, which comprises the aforementioned sensor unit 5 and the likewise aforementioned measuring head 1. Sensor unit 5 and measuring head 1 are, in such case, connected with one another releasably by the 4" tri-clamp fitting 13 shown in the figure and rotatably, or pivotably, around the axis A by means of the hinge 14. Hinge 14 is, in such case, arranged in the illustrated example in the support body 12, which on its part is fixedly connected with the plant, e.g., a bottling plant, and which can be implemented, for example, using a suitable synthetic material, e.g. a plastic. In the example shown in FIG. 5, the arrangement is located in the measurement position, i.e., the bracket shaped measuring head 1 grips around the flow-through cell 3, which is flowed through by a flowable medium located in the plant. Likewise, well recognizable in FIG. 5 is the reference unit 11.1, which is not in use in the shown operating state. The plastic plates 15 and 16 serve largely to block external light, in order to prevent corruption of the measurement results.

Figure 6:
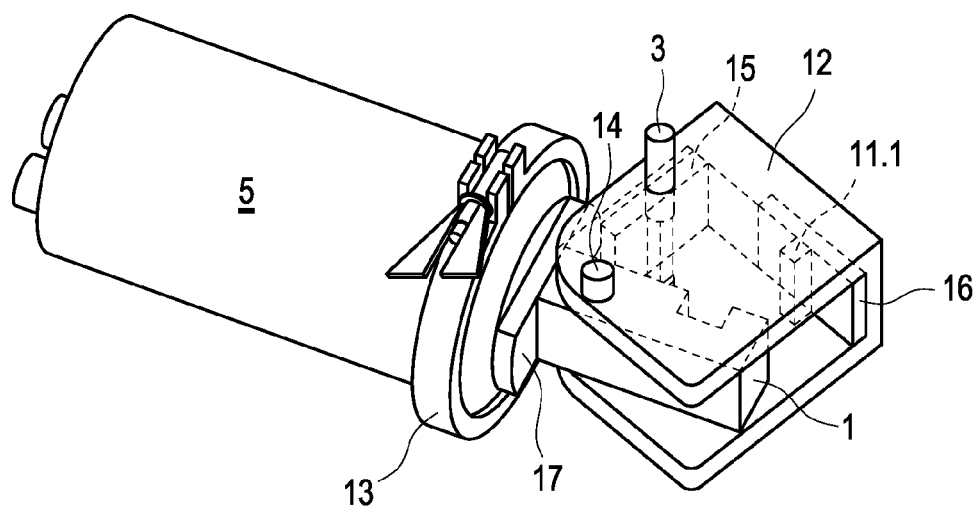
FIG. 6 shows a system of the invention in an intermediate position during the movement.

FIG. 6 shows the arrangement of FIG. 5 in an intermediate position, in which the measuring head is swung out and, for example, can perform a measurement in air. In this representation likewise well recognizable is the reception flange 17, which via the hinge is connected pivotally with the basic unit and to which the sensor unit can be secured by means of the 4" tri-clamp fitting.

Figure 7:
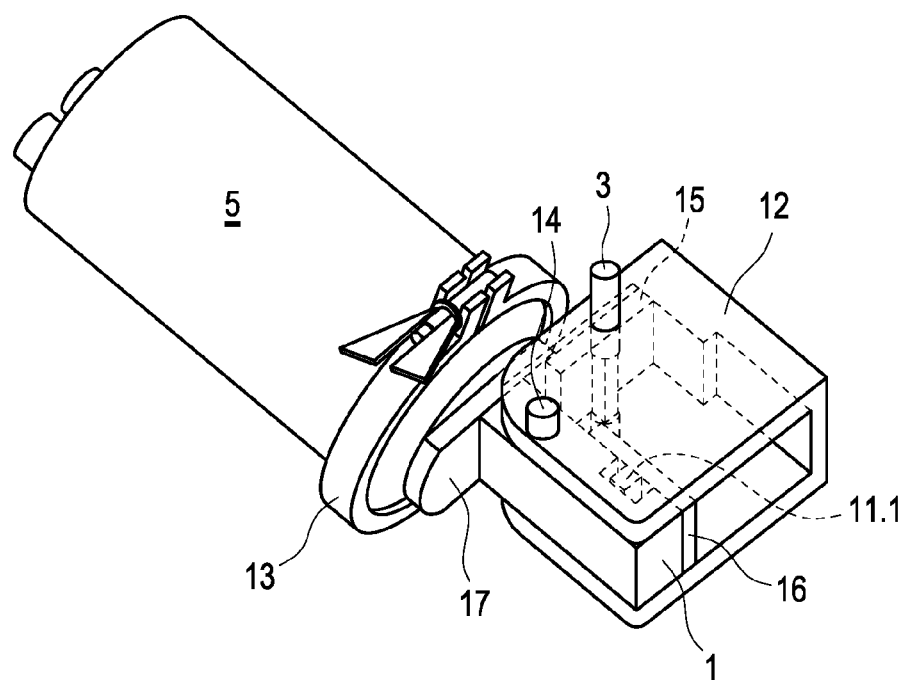
FIG. 7 shows a system of the invention in a service position with introduced reference unit.

In contrast, reference unit 11.1 is engaged in FIG. 7 by the U-shaped recess 2 of the measuring head, so that a reference or calibration measurement can be performed. Not shown in the figures are mechanical stops or even magnetic components, which can be used for a defined positioning of the measuring head 1 relative to the flow measuring cell 3, or relative to the reference unit 11.1.

Figure 8:
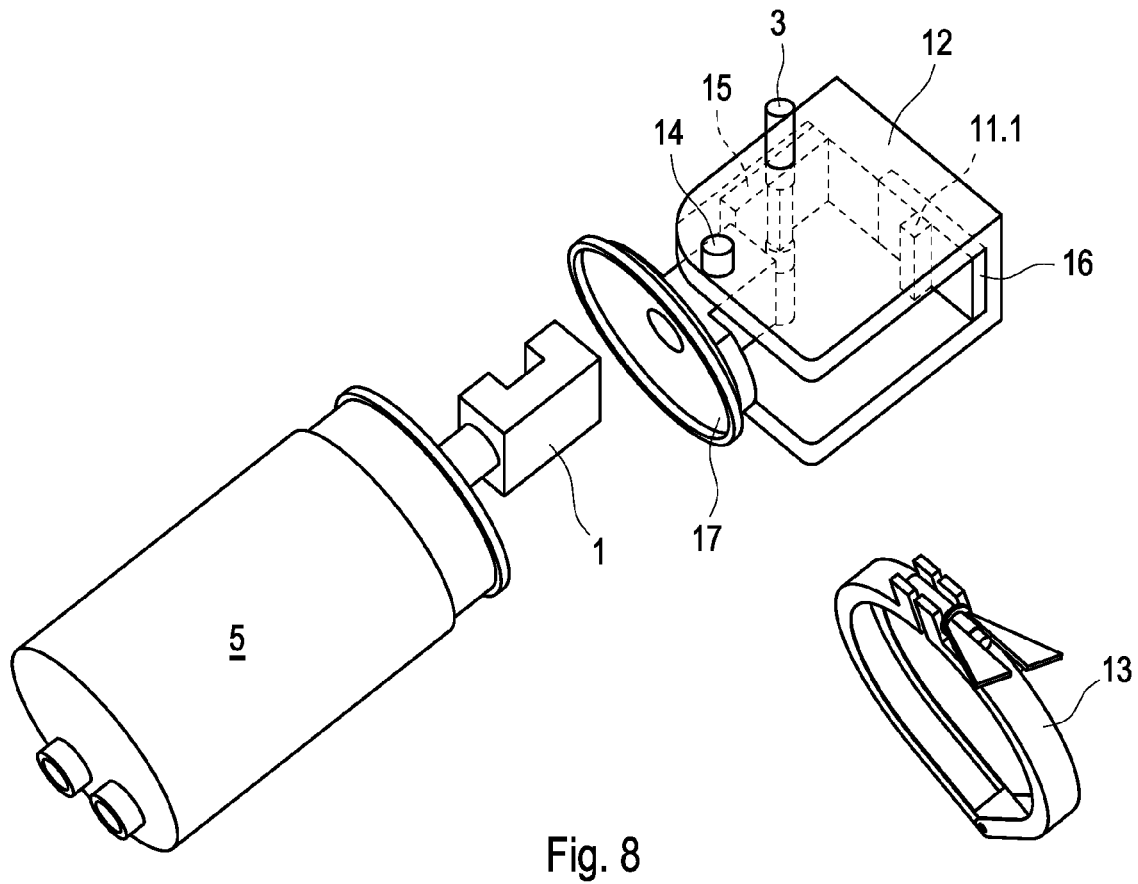
FIG. 8 shows, in an exploded view, the measuring head arranged on the sensor unit in a state released from the remaining arrangement.

FIG. 8 shows in an exploded view the measuring head 1 arranged on the sensor unit 5 and otherwise separated from remaining components. Apparent is the modular construction and the releasability of the sensor unit 5 together with measuring head 1 from the support body 12.

Figure 9:
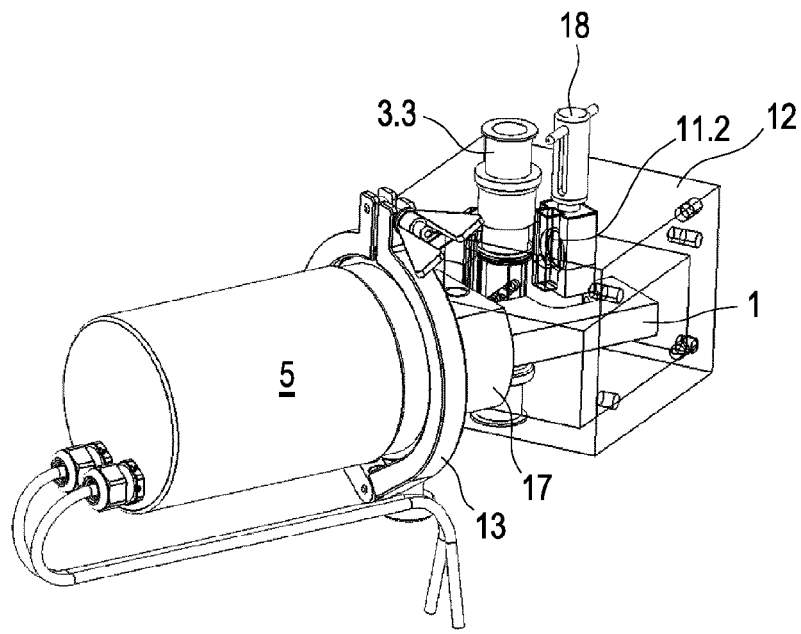
FIGS. 9 and 10 show an alternative form of embodiment of the invention.
Figure 10:
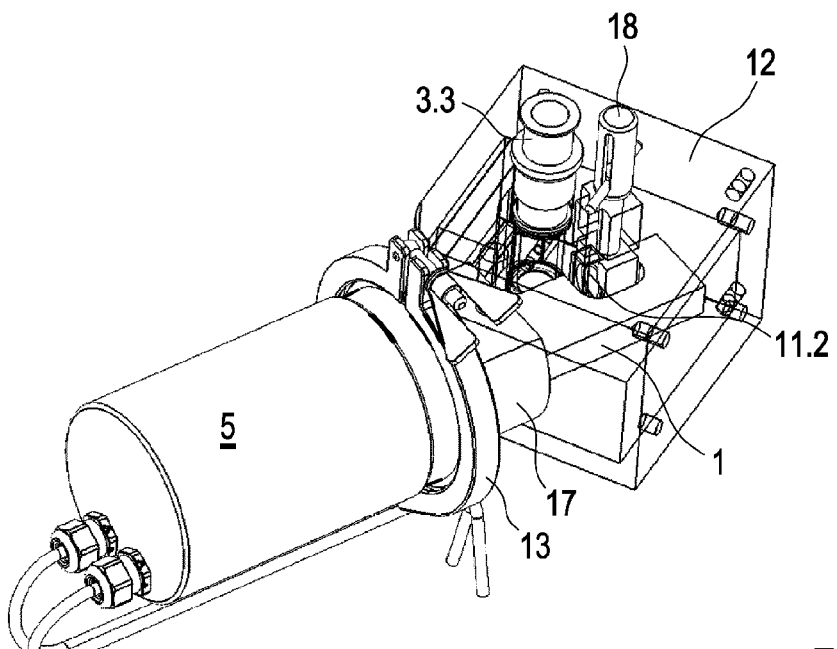

An alternative form of embodiment of the invention is shown in FIGS. 9 and 10. An essential difference compared with the form of embodiment illustrated in FIGS. 5-8 lies in the implementing of the movability of the reference unit 11.2. In the example illustrated in FIGS. 9 and 10, the reference unit 11.2 is moved by means of a reference guiding and locking sleeve 18 in a direction parallel to the pivot axis A. Shown in FIG. 9 is the reference unit 11.2 in an upper position; the measuring head 1 is located in a pivoted out position, and thus does not measure the medium located in the flow-through cell 3.3, and also not the reference unit 11.2. If it is desired that a measurement of the reference unit 11.2 be performed, then it is only necessary that such be lowered from above into the recess of the measuring head 1, such as shown in FIG. 10. Advantageously in such form of embodiment is especially the smaller angular range, through which the sensor unit 5 must be swung in the case of a change from the measurement position into the reference position, a feature, which, in the case of limited installation space, is of considerable use; furthermore, cables, which lead away from the sensor unit 5, are less greatly stressed than in the case of swinging the sensor unit 5 through greater angular ranges.

The invention claimed is:

1. A system for process-integrated optical analysis of flowable media, the system comprising:
   an analytical system configured to analyze the flowable medium in a processing system, wherein the analytical system includes an optical measuring head configured for irradiation of the medium and for receiving measuring radiation; and
   a reference unit;
   wherein the processing system includes a measuring region and is configured to introduce the flowable medium into the measuring region during processing of the medium, wherein the measuring region includes an interior of a flow-through cell, and wherein the measuring region is accessible to the measuring head for the irradiation of the medium and receiving the measuring radiation,
   wherein the analytical system includes a mechanism that includes a hinge point and a support body to which the measuring head is connected, the mechanism configured to enable the measuring head to rotate or pivot or to move linearly and configured to enable positioning of the measuring head relative to the measuring region and relative to the reference unit in defined positions, the defined positions including a measurement position and a reference position,
   wherein a measurement zone of the measurement head at least partially registers with the measurement region in the measurement position, thereby enabling the analytical system to perform a measurement of the medium located in the measuring region, and
   wherein, in the reference position, the measurement head engages the reference unit, thereby enabling the analytical system to perform a measurement of the reference unit.

2. The system of claim 1, wherein the analytical system includes at least one sensor configured for determining a position of the measuring head relative to the measuring region and/or relative to the reference unit.

3. The system of claim 1, wherein the measuring radiation at least partially passes through the measurement zone during the measurement of the medium.

4. The system of claim 3, wherein the measuring zone is disposed at least partially between walls of a U-shaped region of the measuring head.

5. The system of claim 1, wherein the measuring head is adapted to perform a transmission measurement.

6. The system of claim 1, wherein a measurement path is defined along which the measuring radiation travels at least once through the measuring region, the measurement path having a length of less than 100 millimeters.

7. The system of claim 1, wherein the reference unit is configured to move relative to the processing system.

8. The system of claim 7, wherein the reference unit is guided in its movement.

9. The system of claim 7, wherein the reference unit is configured to rotate or pivot or to move linearly.

10. The system of claim 1, wherein the measuring head is connected with a sensor unit, which is configured to be moved with the measuring head.

11. A system for process-integrated optical analysis of flowable media, the system comprising:
- an analytical system configured to analyze a flowable medium in a process which operates upon the flowable medium, wherein the analytical system includes an optical measuring head configured for irradiation of the medium and for receiving measuring radiation,
- wherein the process includes a measuring region and is configured to introduce the flowable medium into the measuring region during processing of the medium, wherein the measuring region includes an interior of a flow-through cell, and wherein the measuring region is accessible to the measuring head for the irradiation of the medium and receiving the measuring radiation; and
- a reference unit configured to move relative to the process,
- wherein the analytical system includes a mechanism that includes a hinge point and a support body to which the measuring head is connected, the mechanism configured to enable the measuring head to rotate or pivot or to move linearly and configured to enable the measuring head to rotate or pivot or to move linearly and configured to enable positioning the measuring head relative to the measuring region and relative to the reference unit in defined positions, the defined positions including a measurement position, in which a measurement zone of the measurement head at least partially registers with the measurement region to enable a measurement of the medium located in the measuring region, and a reference position, in which the measurement head engages the reference unit to enable a measurement of the reference unit.

* * * * *